March 8, 1938.　　　　J. C. MABLE　　　　2,110,147
LAWN MOWER
Filed July 31, 1936　　　2 Sheets-Sheet 2
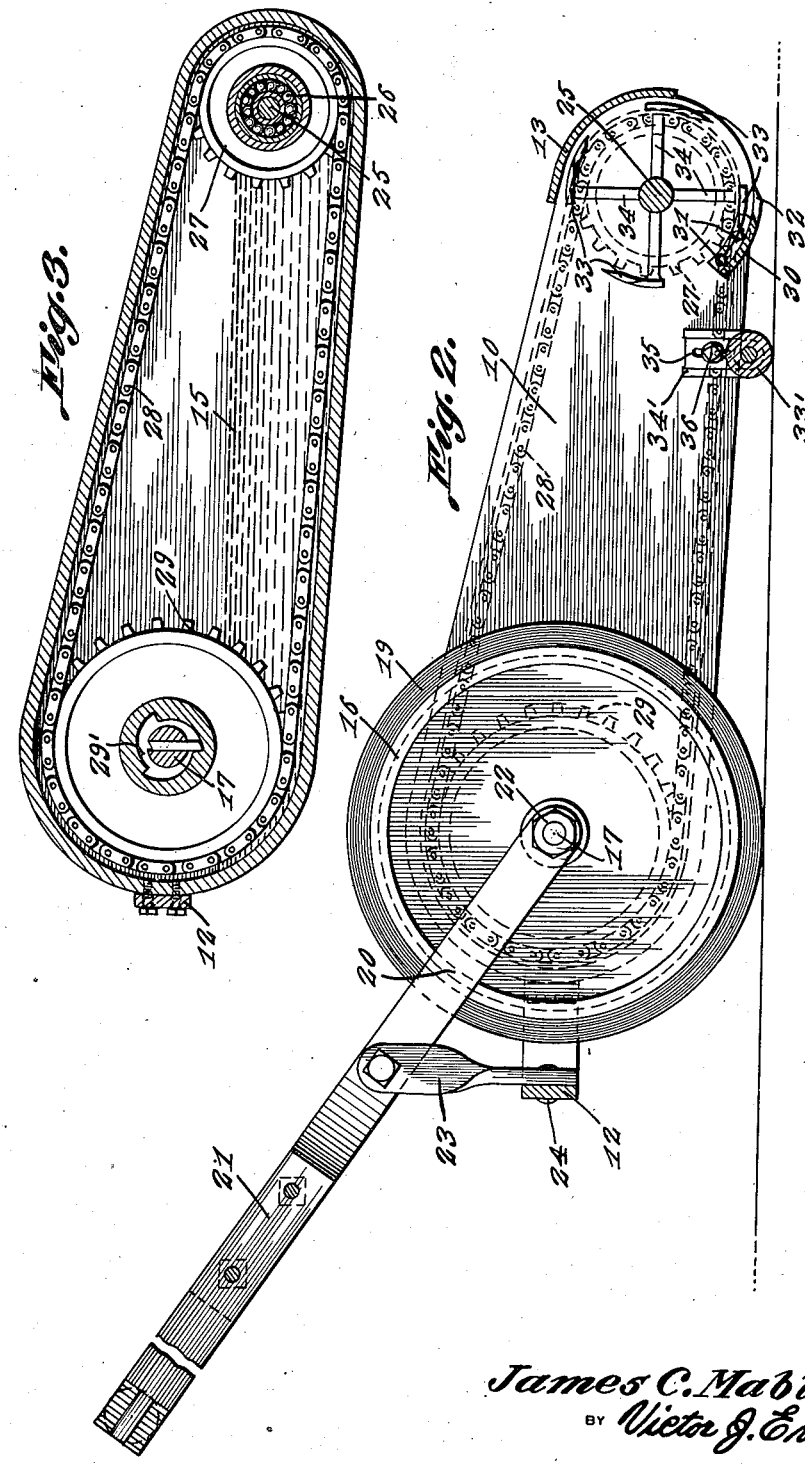
James C. Mable, INVENTOR
BY Victor J. Evans & Co.
ATTORNEYS Patented Mar. 8, 1938

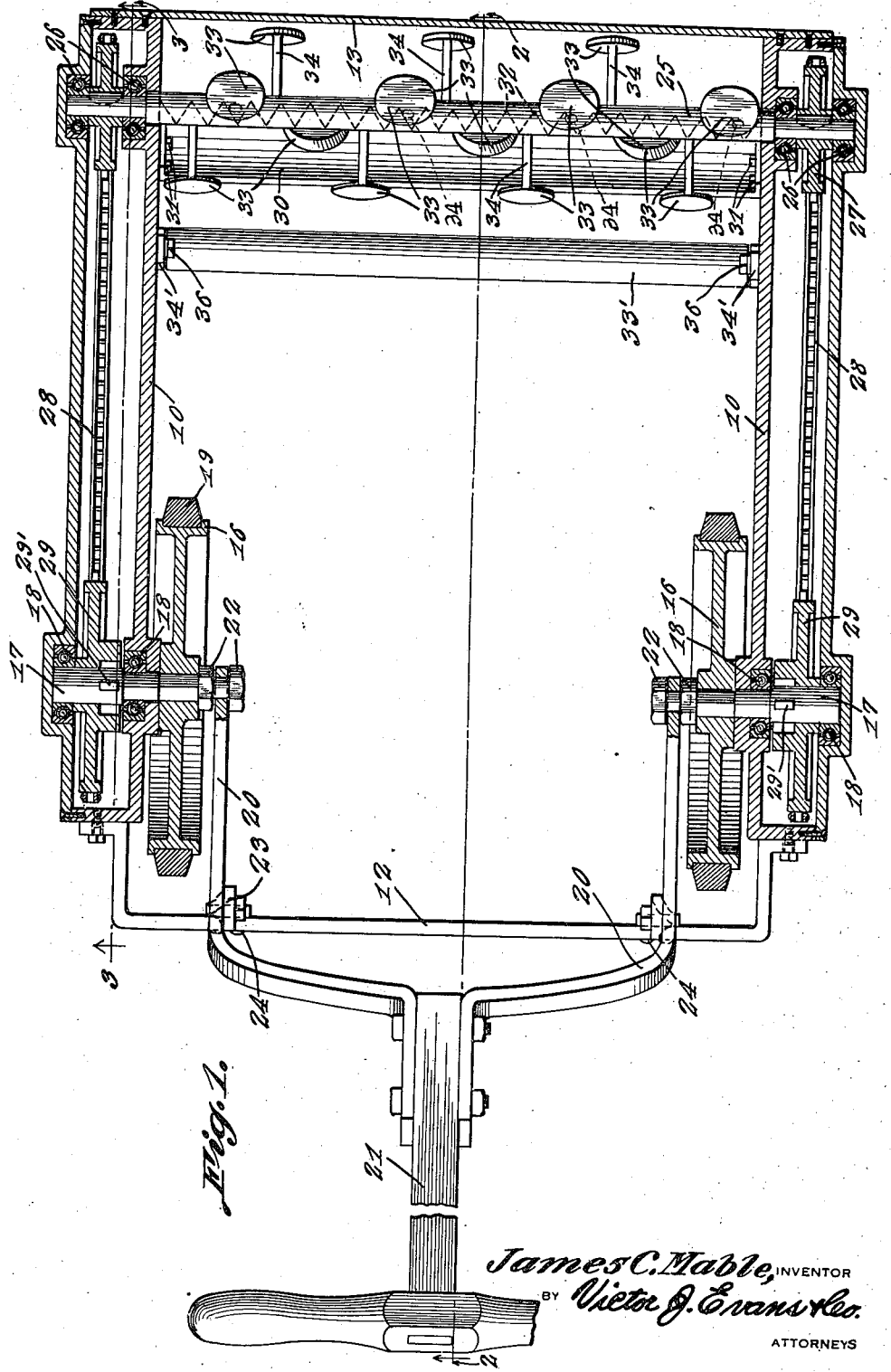

2,110,147

UNITED STATES PATENT OFFICE 2,110,147

LAWN MOWER

James C. Mable, Long Beach, Calif.

Application July 31, 1936, Serial No. 93,688

4 Claims. (Cl. 56—294)

This invention relates to lawn mowers and has for an object to provide a lawn mower in which the cutting blades are in the form of discs mounted on radially extending stems disposed spirally around a driven shaft, the discs rotating in overlapping zones and carrying the grass forcefully against a saw tooth cutting blade whereby the usual spiral blades operating against a fixed blade will be dispensed with and the disadvantages found in such construction will be eliminated.

A further object is to provide a lawn mower in which the cutting mechanism is disposed considerably in advance of the traction wheels and is geared to the ground wheels, the motion transmitting mechanism running in oil baths so that the operation will be silent while at the same time the lawn mower may cut close to buildings and to sidewalks without leaving any ridge for subsequent hand clipping.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a lawn mower constructed in accordance with the invention with parts in section.

Figure 2 is a longitudinal sectional view taken on the line 2—2 of Figure 1.

Figure 3 is a longitudinal sectional view taken on the line 3—3 of Figure 1.

Referring now to the drawings in which like characters of reference designate similar parts in the various views, 10 designates a pair of casings which are connected at the rear ends by a cross bar 12 and at the front end by an arcuate shield 13, best shown in Figure 2. A cross bar (not shown) connects the casings together near the shield 13. These parts form the supporting frame of the lawn mower. The casings are liquid tight and are adapted to receive a supply of oil 15 or other lubricant in which the motion transmission mechanism is submerged to promote quiet operation.

A pair of ground wheels 16 are mounted on respective stub shafts 17 which are journaled in ball bearings 18 in the sides of the casings 10. The ground wheels may be provided with rubber tires 19 if desired. The forked ends 20 of a handle 21 are secured between nuts 22 on the stub shafts, and the handle is braced by links 23 which are riveted to the rear cross bars 12 as shown at 24 in Figure 2.

A driven shaft 25 is mounted at the ends in ball bearings 26 formed in the sides of the casings at the front ends thereof. Sprocket gears 27 are fixed to the ends of the driven shaft and sprocket chains 28 are trained over these gears and over similar sprocket gears 29 having a ratchet device connection 29' with the stub shafts 17 as shown, the sprocket gears 29 being of greater diameter than the sprocket gears 27 whereby the speed of the ground wheels 16 is stepped up and imparted to the driven shaft 25.

An arcuate cutting blade 30 is bolted at the ends to the inner sides of the casings 10 as shown at 31. The blade is substantially arcuate in cross section as best shown in Figure 2 and is provided on the front edge with saw-like cutting teeth 32.

A plurality of cutting discs 33, as shown in Figs. 1 and 2, are mounted eccentrically on respective stems 34 which extend from the driven shaft 25 in the form of a spiral or helix, the discs being of sufficient width to travel circumferentially around the shaft in overlapping zones so that the grass will be intercepted by the discs as the lawn mower is pushed along the ground and will be carried against the saw teeth of the stationary knife blade, the force of the blow serving to sever the grass neatly and uniformly in a path the entire width of the lawn mower.

A roller 33' is mounted on brackets 34' which have slots 35 therein through which bolts 36 are passed and are secured to the casings, these slots and bolts permitting of the roller being adjusted vertically on the casings to raise or lower the front end of the lawn mower and adjust the lawn mower to cut closely or otherwise.

By virtue of the cutting mechanism being disposed considerably in advance of the ground wheels the cutting mechanism can be moved up close to walls and along the edges of side walks so that the ridge hitherto left at these places to be subsequently cut by hand clipping is entirely eliminated.

By virtue of the motion transmission mechanism running in an oil bath the operation of the lawn mower will be silent. At the same time by virtue of the ratchet device connecting the motion transmission mechanism to the ground wheel stub shafts the driven shaft 25 will be rotated when the lawn mower is pushed along the ground but will not be rotated when the lawn mower is pulled backward.

From the above description it is thought that the construction and operation of the invention will be fully understood without further explanation.

What is claimed is:

1. In a lawn mower, side casings supporting a stationary cutting blade at the front ends of the casings, a driven shaft, a plurality of disc-like cutting blades carried by and spaced helically longitudinally of the shaft for intercepting the grass and carrying the same forcibly against the stationary cutting blade, ground wheels supporting the rear ends of said casings and having driving connections through said casings with said driven shaft, and a roller supporting the front ends of said casings having adjustable mountings therefor to the rear of said cutting blade.

2. In a lawn mower, a frame, longitudinal casings on the frame adapted to form oil chambers, ground wheels providing supports at the rear ends of the casings, a roller support for the forward ends of the casings having its bearings secured to the casings to the rear of the front ends thereof, a driven shaft at the front end of the casings, motion transmission mechanism positioned in the casings and connecting the ground wheels with the driven shaft, a stationary cutting blade adjacent to the front ends of the casings, and a plurality of disc-like cutting blades arranged spirally around and carried by the driven shaft for intercepting the grass and forcibly carrying the same against the stationary cutting blade.

3. In a lawn mower, a frame, ground wheels providing supports at the rear end of the frame, means adjacent to the front end of the frame for supporting and varying the height of the front end of the frame from the ground, a driven shaft at the front end of the frame in front of said front supporting means, motion transmission mechanism connecting the ground wheels with said shaft, a stationary saw tooth cutting blade on the frame below the shaft, radially disposed stems arranged spirally around said shaft, and disc-like cutting blades supported eccentrically on the outer ends of said stems and adapted to intercept the grass and forcibly carry the same against the saw tooth cutting blade.

4. In a lawn mower, a stationary cutting blade, a rotary shaft superposed above the cutting blade, a plurality of stems extending radially from the shaft and spaced apart spirally around the shaft, and disc-like cutting blades disposed eccentrically on the outer ends of the stems, said disc-like blades being of sufficient width to travel circumferentially around the shaft in overlapping zones so that the grass will be intercepted by the discs and carried against the stationary cutting blade in a path the entire length of the stationary cutting blade.

JAMES C. MABLE.